(12) United States Patent
Holmèr et al.

(10) Patent No.: US 12,103,103 B2
(45) Date of Patent: Oct. 1, 2024

(54) METHOD FOR FORMING A VEHICLE ASSEMBLY

(71) Applicant: Volvo Car Corporation, Gothenburg (SE)

(72) Inventors: Christian Holmèr, Floda (SE); Manoj Prabahar, Hisings Backa (SE); Mikael Bostrom, Angered (SE); Rashad Kadhim, Gothenburg (SE); Stefan Carlholmer, Vastra Frolunda (SE)

(73) Assignee: Volvo Car Corporation, Gothenburg (SE)

( * ) Notice: Subject to any disclaimer, the term of this patent is extended or adjusted under 35 U.S.C. 154(b) by 1174 days.

(21) Appl. No.: 16/278,253

(22) Filed: Feb. 18, 2019

(65) Prior Publication Data
US 2019/0299328 A1 Oct. 3, 2019

(30) Foreign Application Priority Data
Mar. 29, 2018 (EP) .................................... 18165041

(51) Int. Cl.
*B23K 26/042* (2014.01)
*B23K 26/03* (2006.01)
(Continued)

(52) U.S. Cl.
CPC ............ *B23K 26/042* (2015.10); *B23K 26/03* (2013.01); *B23K 26/70* (2015.10); *B62D 21/15* (2013.01);
(Continued)

(58) Field of Classification Search
CPC .............. B23K 2101/006; B23K 26/03; B23K 26/042; B23K 26/70; B62D 21/15; B62D 65/00; B60R 21/34; B21D 53/88
(Continued)

(56) References Cited

U.S. PATENT DOCUMENTS 5,706,908 A * 1/1998 Sakai ...................... B60R 21/34
180/69.2
5,819,408 A * 10/1998 Catlin .................. B62D 29/008
29/897.2
(Continued)

FOREIGN PATENT DOCUMENTS

CN 1426360 A 6/2003
CN 102120470 A 7/2011
(Continued)

OTHER PUBLICATIONS

Translation DE102014118180 (Year: 2022).*
(Continued)

*Primary Examiner* — Nathaniel E Wiehe
*Assistant Examiner* — Frederick F Calvetti
(74) *Attorney, Agent, or Firm* — Christopher L. Bernard; Clements Bernard Walker

(57) ABSTRACT

A method of assembling a plurality of body structures for forming a vehicle assembly comprising the body structures, the method comprising the steps of: providing a plurality of body structures to be assembled, at least one of the body structures having a deformation region; acquiring information indicating a vehicle assembly type to be formed; mating at least one body structure with another body structure to form the vehicle assembly; and performing a deformation region treatment on at least one deformation region of at least one body structure of the vehicle assembly to form at least one deformable region based on the information indicating vehicle assembly type.

10 Claims, 2 Drawing Sheets

(51) Int. Cl.
*B23K 26/70* (2014.01)
*B62D 21/15* (2006.01)
*B62D 65/00* (2006.01)
*B23K 101/00* (2006.01)

(52) U.S. Cl.
CPC ........ *B62D 65/00* (2013.01); *B23K 2101/006* (2018.08)

(58) Field of Classification Search
USPC .................................................... 219/121.67
See application file for complete search history.

(56) References Cited

U.S. PATENT DOCUMENTS

| | | | | |
|---|---|---|---|---|
| 5,988,305 | A * | 11/1999 | Sakai | B62D 21/15 296/187.04 |
| 6,533,348 | B1 * | 3/2003 | Jaekel | B62D 29/00 296/205 |
| 7,083,223 | B2 * | 8/2006 | Forsman | B62D 21/15 296/187.09 |
| 8,382,197 | B2 * | 2/2013 | Eberlein | B62D 25/04 296/193.06 |
| 9,045,166 | B2 * | 6/2015 | Fellague | B62D 25/04 |
| 9,174,568 | B2 * | 11/2015 | Nemoto | B60Q 1/0491 |
| 9,676,418 | B1 * | 6/2017 | Mohammed | B62D 21/155 |
| 9,908,492 | B2 * | 3/2018 | Hashida | B62D 25/08 |
| 2003/0090129 | A1 * | 5/2003 | Riley | B62D 21/152 296/203.03 |
| 2006/0125291 | A1 * | 6/2006 | Buravalla | B62D 21/15 296/187.03 |
| 2007/0152474 | A1 * | 7/2007 | Lassl | B62D 21/157 296/187.12 |
| 2008/0053739 | A1 * | 3/2008 | Chernoff | B62D 24/04 180/400 |
| 2008/0315628 | A1 * | 12/2008 | Obayashi | B62D 25/04 296/193.06 |
| 2009/0066115 | A1 * | 3/2009 | Browne | B62D 29/00 296/187.03 |
| 2011/0066265 | A1 * | 3/2011 | Gagliano | F16F 15/02 700/95 |
| 2015/0003101 | A1 * | 1/2015 | Nemoto | F21S 45/10 248/548 |
| 2017/0057546 | A1 * | 3/2017 | Dressel | B62D 21/152 |
| 2020/0369140 | A1 * | 11/2020 | McCarron | B60G 7/001 |
| 2022/0332371 | A1 * | 10/2022 | Sotty | C22C 38/26 |

FOREIGN PATENT DOCUMENTS

| | | |
|---|---|---|
| CN | 102448801 A | 5/2012 |
| CN | 103974852 A | 8/2014 |
| CN | 107402044 A | 11/2017 |
| DE | 3700190 A1 | 10/1987 |
| DE | 102011007937 A1 | 7/2012 |
| DE | 102014118180 A1 | 6/2016 |
| EP | 0622289 A1 | 11/1994 |
| EP | 1575821 A1 | 9/2005 |
| WO | 2004054869 A1 | 7/2004 |

OTHER PUBLICATIONS

CN107820468 (Year: 2023).*
First office action and search report issued in the corresponding CN application No. 201910220114.X.
Oct. 25, 2018 European Search Report issue on International Application No. EP18165041.
Feb. 8, 2022 Notification of grant issued in the corresponding CN application No. 201910220114.X.

* cited by examiner

METHOD FOR FORMING A VEHICLE ASSEMBLY

CROSS-REFERENCE TO RELATED APPLICATION

The present patent application/patent claims the benefit of priority of co-pending European Patent Application No. 18165041.7, filed on Mar. 29, 2018, and entitled "A METHOD FOR FORMING A VEHICLE ASSEMBLY," the contents of which are incorporated in full by reference herein.

TECHNICAL FIELD

The present disclosure relates to a method of assembling a plurality of body structures for forming a vehicle assembly comprising the body structures. In particular, the disclosure relates to a method of assembling a plurality of body structures for forming a vehicle assembly in the form of a vehicle chassis. The disclosure also relates to a vehicle chassis assembled according to such method. The present disclosure is applicable on various types of vehicles comprising body structures, in particular cars. Although the example embodiments of the disclosure are described with respect to cars, the present disclosure is not restricted to this in particular, but may also be used in other vehicles such as heavy-duty vehicles, e.g. trucks, buses, construction equipment, working machines and the like.

BACKGROUND ART

When assembling various parts of vehicles, in particular vehicle chassis comprising body structures, it is common to assemble various types of vehicle components along an assembly line. By way of example, body structures of automobiles are assembled along an assembly line to form a vehicle assembly, which can either be a sub-section of a vehicle chassis or an entire vehicle chassis. Some of the assembly steps along the assembly line can be performed by robotic devices allowing for an at least partly automatic assembly. The body structures are typically connected to each other by welding or any other suitable process. As the shapes and dimensions of the body structures varies for different types of vehicles, the robotic devices are required to handle the vehicle parts and components in a sophisticated manner in terms of movements and tolerances.

In addition, there is an increasing demand in current vehicle development on reducing costs and reducing time during assembly and production, while ensuring that various types of assembly lines can handle various types of vehicles. During production, this can be done by reducing the amount of material, replacing expensive materials with less expensive materials, reducing production time etc. During assembly, this can be done by further implementing one or more automatic assembly sequences.

Despite the activity in the field, there remains a need for further improvement in how to simplify the assembly of vehicles, e.g. assembly of parts of vehicle chassis or complete vehicle chassis. In particular, it is desirable to provide an improved method of assembling vehicle chassis without compromising on costs in view of the mass-production of vehicles.

SUMMARY

An object of the example embodiments of the disclosure is to provide a more efficient method of assembling a plurality of body structures for forming a vehicle assembly comprising the body structures and at least one deformable region, which method is capable of providing a number of different types of deformable vehicle assemblies from a plurality of standard body structures. The object is at least partly achieved by a method according to claim 1. Details of some example embodiments and further optional features are recited in the associated dependent claims.

According to a first aspect of the present invention, there is provided a method of assembling a plurality of body structures for forming a vehicle assembly comprising the body structures.

Moreover, the method comprises the steps of:
providing a plurality of body structures to be assembled, at least one of the body structures having a deformation region;
acquiring information indicating a vehicle assembly type to be formed;
mating at least one body structure with another body structure to form the vehicle assembly; and
performing a deformation region treatment on at least one deformation region of at least one body structure of the vehicle assembly to form at least one deformable region based on the information indicating the vehicle assembly type.

By the step of performing the deformation region treatment on a body structure when the number of body structures is formed to the vehicle assembly, it becomes possible to assemble a number of vehicle assembly types having different deformable region characteristics (e.g. vehicle chassis) from essentially the same type of body structures. This is at least partly possible due to that the step of performing the deformation region treatment on the deformation region is carried out late in the assembly sequence, i.e. on a body structure of the formed vehicle assembly type, and that the step of performing the deformation region treatment on the deformation region is based on information indicating the vehicle assembly type. Thus, the example embodiments of the method provide a versatile, yet flexible method of assembling various types of vehicle chassis. In addition, by having at least one deformable region obtained by the deformation region treatment, the vehicle assembly is adapted to deform in a controllable manner.

Accordingly, the example embodiments of the method allow for using a single assembly line for assembling different types of vehicle assemblies (e.g. vehicle chassis), that generally demand different deformation levels, and without replacement of ingoing body structures to form the vehicle assembly so as to provide ingoing body structures with correct deformable characteristics for a given vehicle assembly type.

To this end, the example embodiments of the method provide a relatively inexpensive and simple method that is easy to implement in existing assembly line of vehicles, yet being flexible and possible to adapt according to requirements of the type of vehicle assembly to be formed.

Further, it becomes possible to provide a method of assembling a vehicle assembly comprising a number of body structures, and which is configured for deforming at least at the deformable region. That is, by forming a vehicle assembly having at least one deformable region, the vehicle assembly is configured to absorb energy generated e.g. upon and during a collision or traffic incident by means of the arrangement of the deformable region of the body structure(s).

By acquiring information indicating the type of vehicle assembly to be formed, and subsequently performing the deformation region treatment based on the information of the type of vehicle assembly, it becomes possible to adapt the deformation region treatment and thus the deformable region to the desired type of vehicle assembly. This is particularly useful when assembling several different types of vehicle assemblies and vehicle chassis in one assembly line.

To this end, the method according to the example embodiments allows for using standard body structures to form several different types of vehicle assemblies and vehicle chassis having different types of deformable regions, thus not requiring using body structures with predetermined deformable regions for forming various types of vehicle assemblies. This example advantage is provided by the method because the step of performing the deformation region treatment is based on the information indicating the vehicle assembly type and performed subsequent the step of mating the body structures to the vehicle assembly. Thus, the method according to the example embodiments is less dependent on using tailor-made body structures in terms of deformable regions.

By the provision that the vehicle assembly has at least one deformable region (i.e. a body structure with deformable region), the deformation of the vehicle assembly will likely be initiated at the deformable region, thereby enabling deformation of the vehicle assembly upon a collision in a more controlled manner. Thus, when the vehicle assembly, e.g. a vehicle chassis, is subjected to a force upon a collision, the forces are transferred within the vehicle assembly, which subsequently deforms in a more controlled manner due to the provided deformable region of the body structure(s) of the vehicle assembly.

To this end, the location of the deformable region provides a weakening region so that the corresponding body structure of the vehicle assembly allows for deforming or collapsing essentially along the deformable region. In other words, the deformable region of the body structure contributes to that the deformation is controllable and directed along the vehicle assembly as desired.

In the context of the example embodiments, the term "vehicle assembly" may refer to a vehicle assembly comprising at least two body structures, including, but not limited to, an entire vehicle chassis, a partly assembled vehicle chassis, i.e. vehicle chassis sub-assembly, or any other type of vehicle assembly formed by a plurality of body structures as described herein. Accordingly, the term "vehicle assembly type" refers to a vehicle assembly with a given characteristics including, but not limited to, a given deformable region characteristics.

The vehicle assembly typically comprises a plurality of body structures. The plurality of body structures forms a vehicle assembly when connected or mounted to each other. The vehicle assembly can be a complete vehicle chassis or parts of a vehicle chassis.

The body structures can be provided in several different shapes and dimensions depending on type of body structure. By way of example, the body structure is any one of a front structure, front bumper structure, front floor, chassis part, rear floor, rear bumper structure, underbody, upper body, roof structure, body side outer (BSO), body side inner (BSI), body side complete (BSC) and a combination thereof.

In the context of the example embodiments, the term "deformation region", as used herein, refers to a region of a body structure suitable for being subjected to deformation region treatment. That is, a deformation region of a body structure generally comprises a material structure that is deformable by a deformation region treatment as described herein, e.g. laser deformation region treatment by a laser beam source.

A deformation region treated by the deformation region treatment forms a deformable region, at least in areas where the deformation region is treated by the deformation region treatment. Thus, in the context of the example embodiments, the term "deformable region", as used herein, refers to a region of a body structure being treated by the deformation region treatment so that such region has become more susceptible of being deformed when subjected to a force generated e.g. from a collision of the vehicle or the like, than other regions of the body structure not being treated by a deformation treatment.

In one example embodiment, the step of mating at least one body structure with another body structure to form the vehicle assembly is performed prior to the step of performing a deformation region treatment on at least one deformation region of at least one body structure of the vehicle assembly to form at least one deformable region based on the information indicating the vehicle assembly type.

It is to be noted that the step of mating at least one body structure with another body structure to form the vehicle assembly can include mating a number of body structures to each other in several ways and at several points depending on type of vehicle assembly etc.

In one example embodiment, the step of providing a plurality of body structures to be assembled is performed prior to the step of acquiring information indicating a vehicle assembly type to be formed.

In one example embodiment, the step of acquiring information indicating a vehicle assembly type to be formed is performed prior to the step of providing a plurality of body structures to be assembled.

The information indicating a vehicle assembly type to be formed can be temporarily stored in a control unit. As such, the step of acquiring information, as mentioned above, typically also comprises the step of storing the information indicating the vehicle assembly type to be formed. The control unit is typically configured to process the information so as to perform the subsequent steps.

According to one example embodiment, the step of acquiring information indicating a vehicle assembly type to be formed is performed by scanning an identification tag disposed on one of the provided body structures. Thus, the method typically comprises the step of scanning an identification tag disposed on one of the provided body structures. However, the information indicating the vehicle assembly type can be received from other sources, be stored in the control unit beforehand, be updated manually by an operator, or received from a remote control unit. Thus, by way of example, the step of acquiring information indicating a vehicle assembly type to be formed is performed by actively or passively receiving information relating to the vehicle assembly type.

According to one example embodiment, the deformation region treatment is one of an electronic beam source treatment, gas source for gas-cutting treatment, laser treatment, plasma treatment and water jet treatment.

The use of a laser beam to form the deformable region is advantageous as a laser is contact free. Furthermore, the use of a laser beam to form slits in a body structure allows for providing the body structure with different deformable properties at different deformable regions by forming slits of different sizes, shapes and/or different number of slits per unit area at different locations of the body structure. In particular, it is possible to provide the body structure with different deformation properties at different regions along the body structure direction.

According to one example embodiment, the step of performing a deformation region treatment comprises the step of reducing the thickness at least at a portion of the deformation region. By way of example, the step of performing a deformation region treatment comprises the step of reducing a thickness of at least one deformation region of at least one body structure of the vehicle assembly to be formed.

According to one example embodiment, the step of performing a deformation region treatment comprises the step of forming a slit extending along the deformation region. Thus, the step of performing a deformation region treatment creates a slit in said deformation region to form the deformable region. The configuration of having deformable regions defined by one or more slits enables a plastic deformation (i.e. collapse) of the corresponding body structure rather than an elastic deformation. Accordingly, a body structure having a slit is configured for being plastically deformed upon a collision.

In addition, by performing deformable region(s) in the form of slit(s), it becomes possible to obtain and vary the deformation properties of a body structure for a given type of vehicle assembly during assembly of the vehicle assembly type, thereby meeting the requirements of deformation levels of the vehicle chassis for a specific type of vehicle. By using slit(s) as deformable region(s) it is also possible to vary the type of slit(s) in terms of location, size and pattern, thereby allowing for a fine tuning of the deformation in view of the vehicle assembly type.

According to one example embodiment, the step of performing a deformation region treatment comprises the step of forming a plurality of slits extending along the deformation region.

In one example embodiment, at least one of the body structures of the vehicle assembly comprises deformable regions having different deformation levels. Typically, although not strictly necessary, the deformation level of the deformable region is adjusted by amending the shape and extension of slit(s).

Typically, although not strictly necessary, the body structure is made of steel, such as standard steel, high strength steel or stainless steel. However, other materials are also conceivable depending on vehicle assembly type to be formed by the method according to the example embodiments. The body structures can thus be made of a metallic material or a non-metallic material such as plastics. Also, the body structure may be a load-supporting body structure.

Typically, the deformable region of the body structure is formed by a plurality of slits. By way of example, the plurality of slits is arranged in given pattern based on the information indicating vehicle assembly type. The plurality of slits may extend opposite each other along the body structure or extend in different directions across the body structure.

In some design variants, the deformable region of the body structure is formed by a pair of slits extending opposite each other along the body structure. For example, the deformable region of the body structure is formed by a pair of slits extending opposite each other along the body structure and at a substantially equal distance from each other along the body structure.

In some design variants, the deformable region of the body structure is formed by a pair of slits extending opposite each other along the body structure, while the pair of slits comprises slits of different shapes and dimensions, e.g. one straight slit and one curved slit.

By way of example, the slit extends at least partly in a thickness direction of the deformation region. Alternatively, the slit extends entirely through the deformation region in the thickness direction of the deformation region.

Typically, the slit is any one of a straight slit, curved slit, a piecewise-linear slit, and piecewise-curved slit.

The extension of the slit may vary depending on type of desired deformation characteristics. By way of example, the slit is any one of a continuously extending slit and a discontinuously extending slit. Continuous extending slits can for example be formed by a continuous and/or a pulsed laser with a high pulse frequency. Discontinuous extending slits can for example be formed by a pulsed laser where the pulse frequency is suitably matched to the desired results.

According to one example embodiment, the method further comprising the step of determining deformation region treatment type based on the acquired information indicating the vehicle assembly type to be formed.

According to one example embodiment, the method further comprising the step of determining location of the deformable region position based on the acquired information indicating the vehicle assembly type to be formed. In this manner, it becomes possible to adapt and determine the location of the deformable region in view of the information indicating the vehicle assembly type. Further, it becomes possible to further improve the method of assembling vehicle assemblies with different types of deformable regions for various individual vehicle assemblies.

Moreover, by the step of determining location of the deformation region treatment position of the deformation based on the acquired information indicating the vehicle assembly type to be formed, it becomes possible to arrange the deformable regions on the body structure so as to direct (i.e. transfer) the forces generated from a vehicle collision in order to absorb the energy in an efficient manner.

The example embodiments of the method are particularly applicable on assembling body structures of automobile chassis. The example embodiments of the method may likewise be applicable on other types of vehicles.

According to a second aspect of the present invention, there is provided a control unit configured to perform any one of the steps of the method according to any one of the example embodiments and/or the features as described above in relation to the first aspect of the present invention.

Effects and features of the second aspect are largely analogous to those described above in relation to the first aspect of the present invention.

It should be noted that the control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. As mentioned above, the control unit may be a digital control unit; however, the control unit may also be an analog control unit. In addition, the control unit may be configured to control each one of the steps of a vehicle assembly line relating to the steps of the example embodiments; in particular, the control unit may be configured to control the step of performing the deformation region treatment as mentioned above.

According to a third aspect of the present invention, there is provided a vehicle chassis assembled according to any one of the example embodiments and/or the features as described above in relation to the first aspect of the present invention.

According to a fourth aspect of the present invention, there is provided a computer program comprising program code means for performing the steps described above in relation to the first aspect of the present invention when the program is run on a computer. According to a fifth aspect of the present disclosure, there is provided a computer readable medium carrying a computer program comprising program means for performing the steps described above in relation to the first aspect of the present invention when the program means is run on a computer.

Effects and features of the third, fourth and fifth aspects are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein:

FIGS. 1a to 1d illustrate various steps of a method according to one example embodiment of the present disclosure.

Figure 2A:
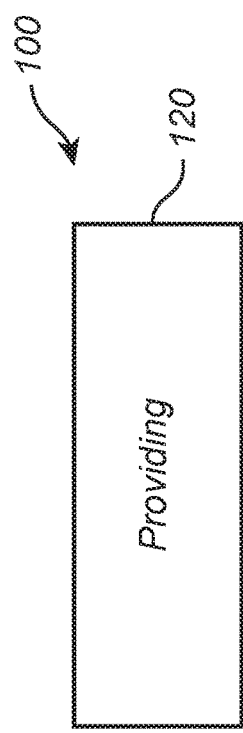
FIGS. 2a to 2d illustrate a block diagram depicting the steps of the method in FIGS. 1a to 1d.

With reference to the appended drawings, below follows a more detailed description of embodiments of the disclosure cited as examples.

DESCRIPTION OF EMBODIMENTS

The example embodiments of the present disclosure will now be described more fully hereinafter with reference to the accompanying drawings, in which exemplary embodiments of the disclosure are shown. The example embodiments of the disclosure may, however, be embodied in many different forms and should not be construed as limited to the embodiments set forth herein; rather, these embodiments are provided for thoroughness and completeness. Like reference character refer to like elements throughout the description.

Figure 1A:
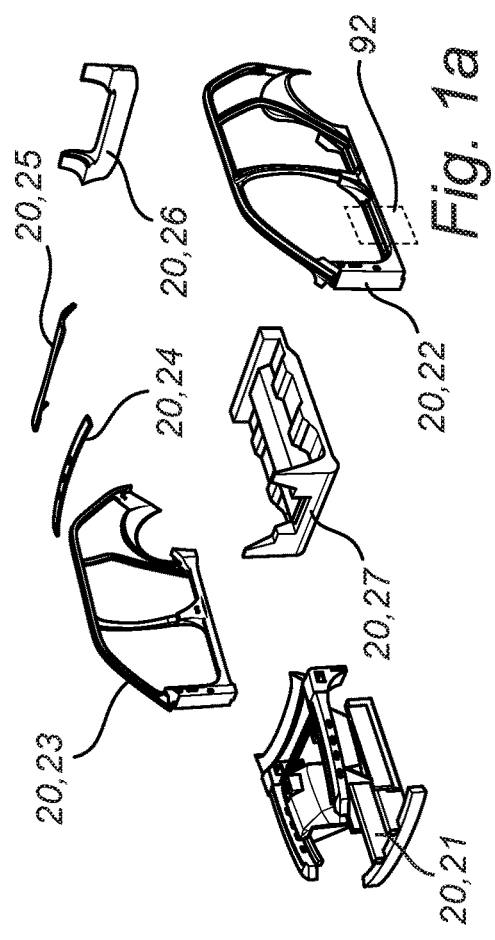

FIG. 1a shows a number of body structures making up a vehicle assembly such as parts of a vehicle chassis prior to assembly, while FIG. 1c shows the number of body structures connected to each other after assembly to form the vehicle assembly.

Figure 1B:
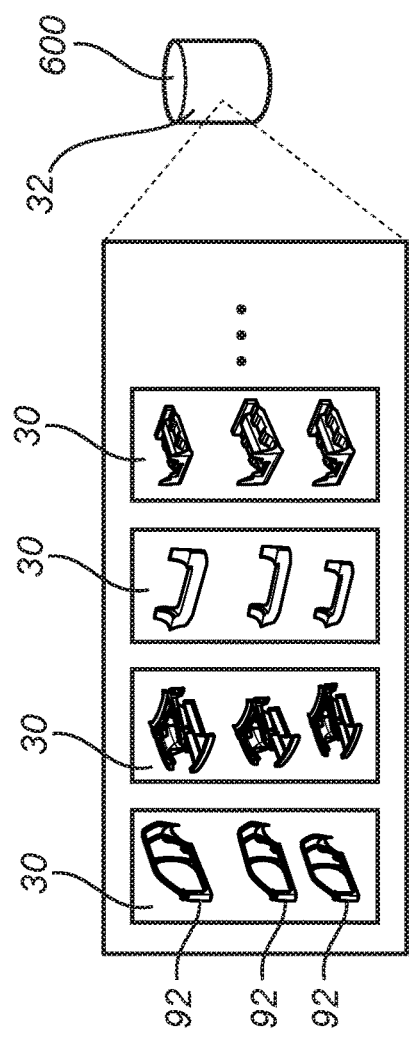

FIG. 1b illustrates information indicating a vehicle assembly type to be formed. By way of example, a model of the assembled vehicle assembly type 32 is stored in a control unit 600. By way of example, the control unit contains information on a number of different vehicle assembly types. Each one of the vehicle assembly types includes a number of body structures. Thus, control unit contains a number of vehicle assembly type models, each one containing a number of virtual body structures 30. That is, the vehicle assembly type 32 comprises information relating to the number of virtual body structures 30. The vehicle assembly types stored in the control unit varies in this example based on type of deformation characteristic. In other words, one vehicle assembly type is distinguished from another vehicle assembly type at least in terms of deformation capability when subjected to an estimated external force, occurring e.g. from a traffic collision or the like. In order to adapt a given vehicle assembly type to a certain deformation characteristic, the given vehicle assembly has a desired associated deformable region. The deformable region is typically a region on a body structure which beforehand has been deformed by a deformation region treatment. Thus, the body structures should be made of a material that at least on a certain region is susceptible for deformation when subjected to an external force occurring e.g. from a collision by the vehicle.

Accordingly, each one of the virtual body structures contains information about their deformation region 92. It is to be noted that the virtual body structures and corresponding information should at least reflect the provided body structures 20 and their characteristics of the vehicle assembly type to be formed.

The information indicating the vehicle assembly type 32 is stored in the control unit 600. By way of example, the information indicating the vehicle assembly type can be received from a tag on one of the body structures 20 or from another database including information relating to the type of vehicle assembly to be formed. Moreover, the control unit 600 is configured to perform the operations of assembling the plurality of body structures to form a vehicle assembly type, such as the vehicle chassis. In addition, the control unit 600 is typically configured to perform any one of the steps of the method according to the example embodiments as described herein, and which are further described in relation to the FIGS. 2a-2d.

With reference now to e.g. FIGS. 1b and 1d, the vehicle assembly 10 comprises the plurality of body structures 20. As depicted in FIG. 1d, the body structures 20 form the vehicle assembly 10 when mated to each other, i.e. connected or mounted to each other. The vehicle assembly can be a complete vehicle chassis or parts of a vehicle chassis, as illustrated in FIG. 1d. In this example, the body structures are mated together by welding. However, the process of connecting body structures to each other can be performed in several different manners as is known in the art.

Moreover, the body structures can be provided in several different shapes and dimensions depending on type of vehicle chassis to be formed and types of body structures. In FIG. 1b, there is depicted a number of body structures 20 such as a front structure 21, a front floor 27, a rear chassis part 26, roof structures 24 and 25, body side inner 22, 23. An assembled vehicle assembly 10 of these body structures is illustrated in FIG. 1d.

As mentioned above, the control unit 600 is configured and operable to perform the operational steps of the method according to the example embodiments as described herein, and which are further described in relation to FIGS. 1a-1d and 2a-2d. The control unit can be a part of a vehicle assembly line. Turning now to the operation of the method, one example embodiment of the sequences of a method adapted to assemble the plurality of body structures to the vehicle assembly is depicted in FIGS. 1a-1d and 2a-2d. With reference to FIGS. 1a-1d and 2a-2d, there is depicted a method 100 of assembling a plurality of body structures 20 for forming the vehicle assembly 10 comprising the body structures.

By way of example, the method comprises the step 120 of providing a plurality of body structures to be assembled. At least one of the body structures has a deformation region 92, as mentioned above. The step 120 is illustrated in FIGS. 1a and 2a. The deformation region 92 of the body structure 20, 22, which is illustrated in FIG. 1a, is only one example of a possible location on a possible body structure 22.

Figure 2B:
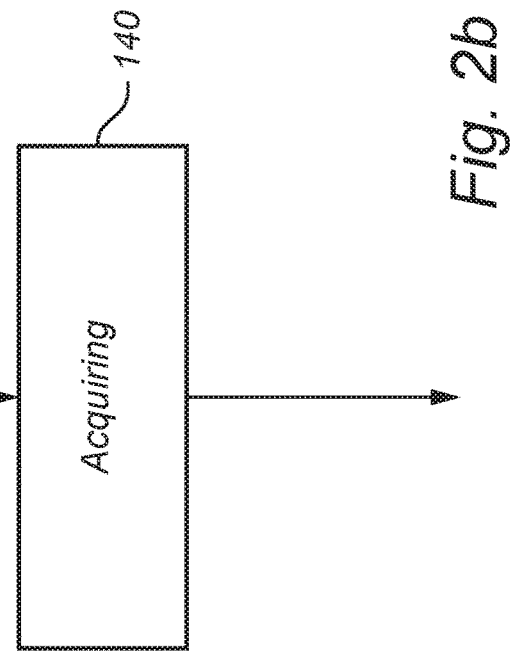

Subsequently, the method in step 140 acquires information indicating the vehicle assembly type 32 to be formed. The step 140 is illustrated in FIGS. 1b and 2b. By way of example, the step of acquiring information indicating a vehicle assembly type to be formed is performed by scanning an identification tag (not shown) disposed on one of the provided body structures. The tag in this example comprises at least information indicating the vehicle assembly type to be formed.

The information indicating a vehicle assembly type to be formed can be temporarily stored in the associated control unit, e.g. the control unit 600. As such, the step 140, as mentioned above, generally also comprises the step of storing the information indicating a vehicle assembly type to be formed. The control unit is typically configured to process the information so as to perform the step 180, as mentioned above.

Optional, the method further comprises the step of determining deformation type based on the acquired information indicating the vehicle assembly type to be formed. Hence, the identification tag typically comprises type of deformation for the given vehicle assembly type.

Optionally, the method further comprises the step of determining location of the deformation treatment position of the deformation based on the acquired information indicating the vehicle assembly type to be formed. Hence, the identification tag typically comprises information relating to deformation treatment position on the vehicle assembly for the given vehicle assembly type.

Figure 2C:
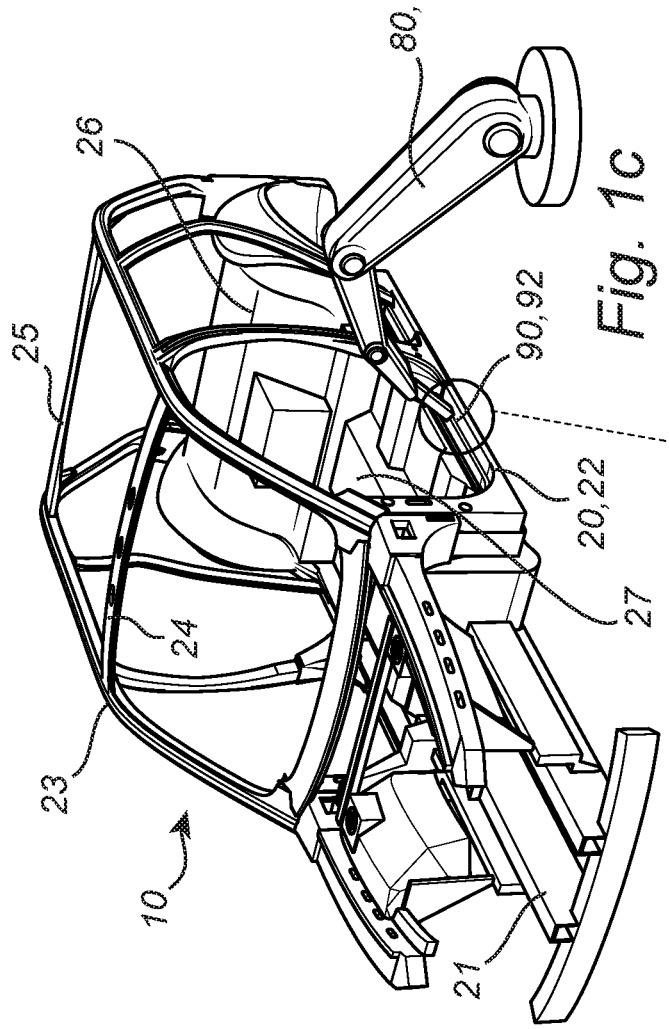
Figure 2C:
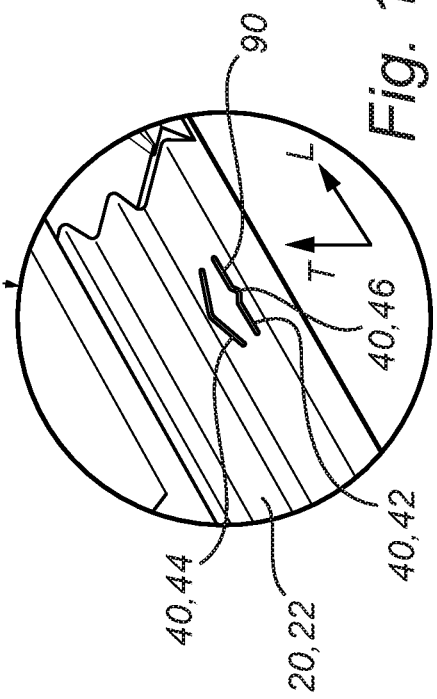
Figure 2C:
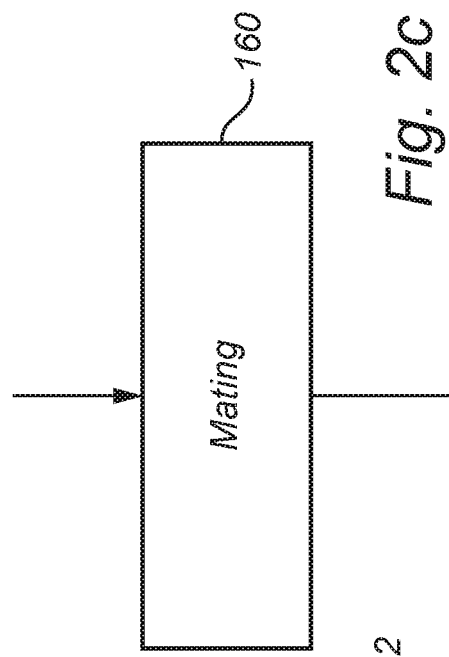

In step 160, which is illustrated by FIG. 2c, the number of body structures 20 is mated to each other to form the vehicle assembly 10. As may be gleaned from FIG. 1c, the front structure 21, the front floor 27, the rear chassis part 26, the roof structures 24 and 25 and the body side inner 22, 23 are mated relative each other. As mentioned above, the body structures are mated by welding.

With reference now to FIG. 1c, and particularly FIG. 1d, the vehicle assembly line also comprises a robotic device 80 configured to perform a deformation region treatment of the deformation region 92 to form the deformable region 90. The robotic device in this example embodiment is configured to perform a number of slits 40 in the body side inner structure 22. In particular, the robotic device is configured to perform a number of slits in the deformation region 92 of the body side inner structure 22. By way of example, the robotic device comprises a laser beam source 82 for treating the deformation region 92 with laser. In other words, in this example embodiment, the deformation region treatment is a laser treatment. The laser treatment is performed until the characteristics of the deformable region corresponds to the desired deformable region of the given vehicle assembly type, which is e.g. stored in the control unit 600.

Figure 2D:
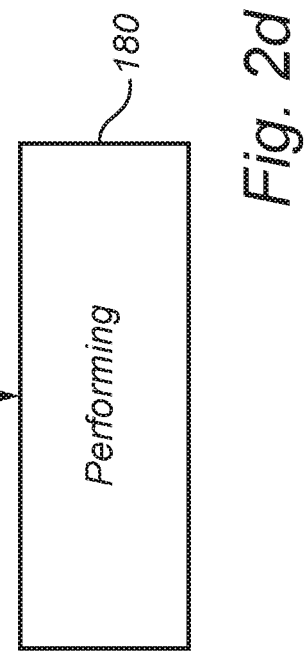

Accordingly, as illustrated by FIG. 2d and shown in FIGS. 1c and 1d, the method comprises the step 180 of performing the deformation region treatment on one deformation region 92 of one body structure 20, i.e. the body side inner structure 22 of the vehicle assembly, to form the deformable region 90. The type of deformation treatment and the location of the deformable region are determined based on information indicating the vehicle assembly type from the previous step 140. In this manner, the deformation region treatment forms at least one deformable region based on the information indicating vehicle assembly type.

Moreover, as mentioned above, in step 180, the deformation region treatment is performed by forming a slit extending along the deformation region 92 to form the deformable region 90. In this example, the slit extends along a length direction L of the body structure 20, 22.

By way of example, the slit extends at least partly in a thickness direction T of the deformation region 92 (although not shown in FIG. 1d). Alternatively, the slit extends entirely through the deformation region in the thickness direction T of the deformation region 92.

As illustrated in FIG. 1d, the number of slits can have various shapes. By way of example, the deformable region 90 comprises a straight slit 42, curved slit 46, and a piecewise-linear slit 44. Other shapes and dimensions of the slits are also conceivable. While the slits in FIG. 1d are provided in the form of continuously extending slits, it is also possible to form broken line slits, i.e. discontinuously extending slits (although not shown in FIG. 1d).

In other words, the deformation region treatment comprises the step of forming at least one slit in in the body structure, which slit extends through the material of the body structure, i.e. in the thickness direction T of the body structure 22. It is to be noted that the other parts of the body structure and the parts of the vehicles assembly formed by the body structures remain essentially intact by exposure of the body structure to the laser beam source. That is, the laser beam source cuts through the body structure at its deformation region 92 to form the deformable region 90, while other regions and parts of the body structure remain essentially intact. However, the method may continue to perform additional deformation region treatment on other body structures in view of the information indicating the vehicle assembly type so as to form additional deformable regions.

In FIG. 1d, there is depicted a body structure 22 with the deformable region 90 comprising a first slit 42 extending through the thickness of the body structure, in the thickness direction T. The slit has been formed via exposure to the laser source 82 of the robotic device 80, which cuts through the body structure 22 based on information indicating vehicle assembly type.

In deformable regions 90 where one or more slits are present, the body structure will have a higher tendency to deform as each one of the slits creates a weakening region of the body structure. As different vehicle chassis types have different demands in terms of deformation when subjected to external forces, the deformation region treatment for one vehicle chassis type often differs from another vehicle chassis type. By performing the steps of the method as described above, it becomes possible to provide a method that is capable of providing a number of different types of deformable vehicle assemblies from a plurality of standard body structures by performing tailor-made deformation region treatment based on acquired information indicating vehicle assembly type to be formed.

It is to be noted that any numerical designations, such as "first" or "second" are illustrative only and are not intended to limit the scope of the invention in any way.

It is to be understood that the present invention is not limited to the embodiments described above and illustrated in the drawings; rather, the skilled person will recognize that many changes and modifications may be made within the scope of the appended claims.

The invention claimed is:

1. A method comprising the steps of:
providing a plurality of body structures to be alternatively assembled to form one vehicle assembly or another vehicle assembly, at least one of the body structures having a deformation region that is intended to be weakened to provide controlled deformation for both the one vehicle assembly and the another vehicle assembly when each is subjected to an external force;
acquiring information indicating an intended deformation capability of the one vehicle assembly when subjected to the external force and an indication of one deformation region treatment to be applied to the deformation region of the at least one of the body structures in the one vehicle assembly and an intended deformation capability of the another vehicle assembly when subjected to the external force and an indication of another deformation region treatment to be applied to the deformation region of the at least one of the body structures in the another vehicle assembly;
assembly assembling the plurality of body structures;
selecting either the one vehicle assembly or the another vehicle assembly; and
performing an appropriate deformation region treatment on the at least one of the body structures based on the selected one vehicle assembly or another vehicle assembly using either the information indicating the one deformation region treatment for the one vehicle assembly or the another deformation region treatment for the another vehicle assembly.

2. The method according to claim 1, wherein the step of acquiring the information indicating the vehicle assembly to be formed is performed by scanning an identification tag disposed on one of the provided body structures.

3. The method according to claim 1, wherein the deformation region treatment is one of an electronic beam source treatment, gas-cutting treatment, laser treatment, plasma treatment, and water jet treatment.

4. The method according to claim 1, wherein the step of performing the deformation region treatment comprises reducing a thickness of at least one deformation region of at least one body structure of the vehicle assembly to be formed.

5. The method according to claim 1, wherein the step of performing the deformation region treatment comprises forming a slit extending along said deformation region.

6. The method according to claim 5, wherein the slit is any one of a straight slit, curved slit, piecewise-linear slit, and piecewise-curved slit.

7. The method according to claim 5, wherein the slit is any one of a continuously extending slit and a discontinuously extending slit.

8. The method according to claim 1, wherein the body structure is any one of a front structure, front bumper structure, front floor, chassis part, rear floor, rear bumper structure, underbody, upper body, roof structure, body side outer (BSO), body side inner (BSI), body side complete (BSC), and a combination thereof.

9. The method according to claim 1, further comprising the step of determining a deformation region treatment based on the acquired information indicating the vehicle assembly to be formed.

10. The method according to claim 1, further comprising the step of determining a deformation region treatment position based on the acquired information indicating the vehicle assembly to be formed.

* * * * *